Figure 1:
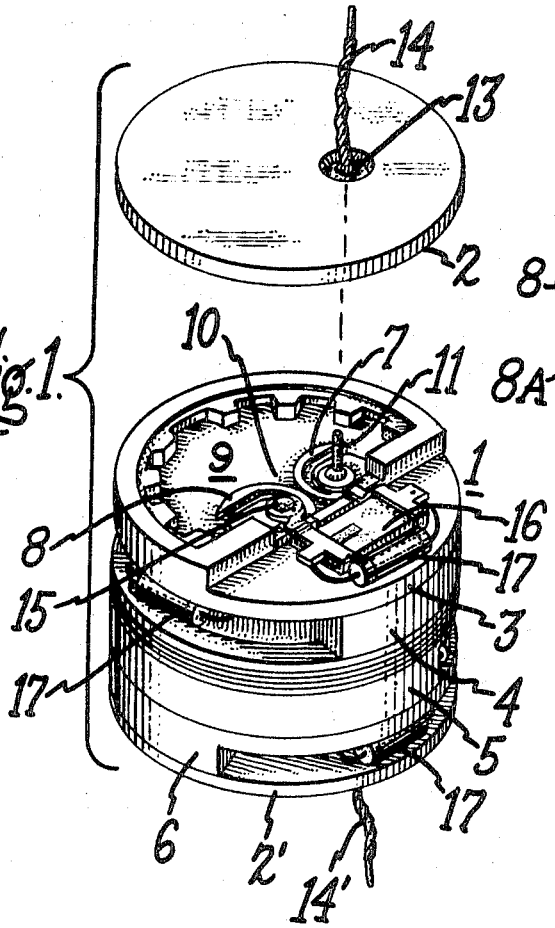
Figure 2:
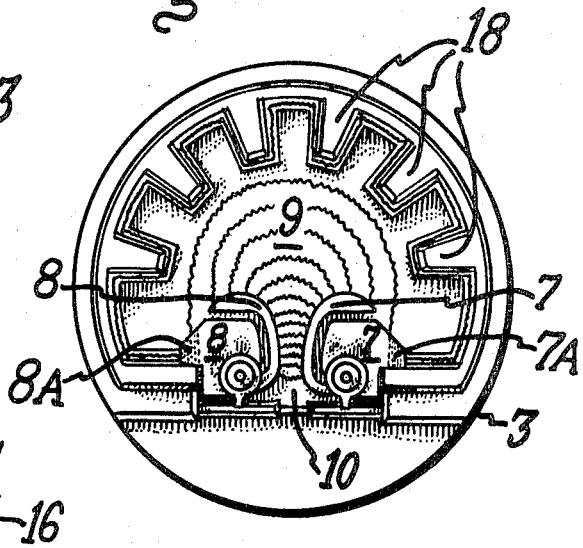
Figure 3:
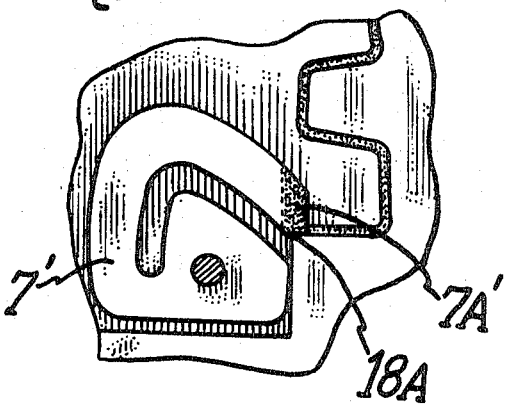
Figure 4:
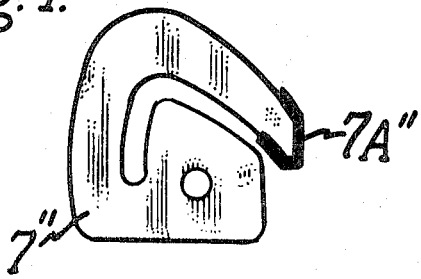

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 5, 1973

911 O.G. 9

T911,010

SPARK GAP ASSEMBLY HAVING ARC-EROSION RESISTANT ELECTRODES

Eugene C. Sakshaug, Grove Ave., Lanesborough, Mass. 01237, and Earl W. Stetson, 132 Unkamet Drive, Pittsfield, Mass. 01201

Continuation of application Ser. No. 869,043, Oct. 24, 1969. This application Sept. 29, 1972, Ser. No. 293,654

Int. Cl. H01n *1/00, 7/44, 13/46*

U.S. Cl. 313—325

1 Sheet Drawing. 10 Pages Specification

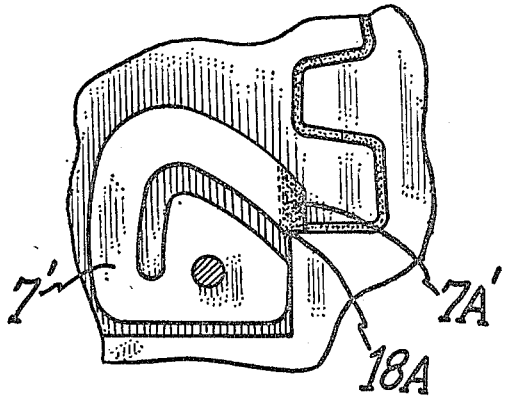

A spark gap assembly of a type utilized in lightning arresters is provided with electrodes comprising arc-running surfaces having good electrical conductance, in combination with arc-terminal portions formed of refractory metal that prevents arcs extinguished in the spark gap assembly from eroding the arc-terminal portions of the electrodes.

June 5, 1973 E. C. SAKSHAUG ETAL T911,010

SPARK GAP ASSEMBLY HAVING ARC-EROSION RESISTANT ELECTRODES

Original Filed Oct. 24, 1969